United States Patent
Tan et al.

(10) Patent No.: US 9,832,259 B2
(45) Date of Patent: Nov. 28, 2017

(54) METHOD AND APPARATUS FOR CELL CONFIGURATION

(71) Applicant: Huawei Technologies Co., Ltd., Shenzhen, Guangdong (CN)

(72) Inventors: Cheng Tan, Shanghai (CN); Xiaoxin Wu, Beijing (CN); Yubin Xia, Shanghai (CN); Haibo Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 737 days.

(21) Appl. No.: 14/318,900

(22) Filed: Jun. 30, 2014

(65) Prior Publication Data
US 2015/0026293 A1    Jan. 22, 2015

(30) Foreign Application Priority Data
Jun. 28, 2013 (CN) .......................... 2013 1 268703

(51) Int. Cl.
G06F 15/16 (2006.01)
H04L 29/08 (2006.01)
G06F 11/14 (2006.01)
G06F 21/64 (2013.01)

(52) U.S. Cl.
CPC ...... H04L 67/1095 (2013.01); G06F 11/1464 (2013.01); G06F 11/1484 (2013.01); G06F 21/645 (2013.01)

(58) Field of Classification Search
CPC ............. G06F 11/1464; G06F 11/1484; G06F 21/645; H04L 67/1095
See application file for complete search history.

(56) References Cited

U.S. PATENT DOCUMENTS 7,552,358 B1 * 6/2009 Asgar-Deen ........ G06F 11/1435
714/15
8,019,863 B2 * 9/2011 Jeide ................... H04L 67/1095
709/223
8,291,170 B1   10/2012 Zhang et al.
(Continued)

FOREIGN PATENT DOCUMENTS

CN          101140529 A      3/2008
CN          100440859 C      12/2008
(Continued)

*Primary Examiner* — June Sison
*Assistant Examiner* — Dixon Dabipi

(57) ABSTRACT

A method, an apparatus, a terminal, and a server for synchronizing a terminal mirror are provided. The method includes: obtaining, by a terminal, multiple input events during running of application software; aggregating the multiple input events to obtain an aggregate event; and transmitting the aggregate event to the server, so that after parsing the aggregate event to obtain the multiple input events, the server processes the multiple input events by using a virtual machine that is of the terminal and set on the server, so as to obtain user data generated during the running of the application software. In the present invention, the terminal transmits the input events to the server in an event-driven manner, so that the server obtains the user data that is the same as that on the terminal that runs the application software, thereby ensuring that the server can back up complete user data.

12 Claims, 7 Drawing Sheets

(56) References Cited

U.S. PATENT DOCUMENTS

| | | | |
|---|---|---|---|
| 8,694,700 B1* | 4/2014 | Natanzon | G06F 3/061 709/233 |
| 8,930,653 B1* | 1/2015 | Chatterjee | G06F 11/1453 711/154 |
| 2005/0131990 A1* | 6/2005 | Jewell | G06F 11/1464 709/201 |
| 2006/0085792 A1 | 4/2006 | Traut | |
| 2009/0083735 A1 | 3/2009 | Kimura | |
| 2011/0246721 A1 | 10/2011 | Crisan | |
| 2011/0271212 A1 | 11/2011 | Newman et al. | |
| 2011/0271213 A1 | 11/2011 | Newman et al. | |
| 2012/0297020 A1* | 11/2012 | Nishibe | H04L 67/00 709/217 |
| 2014/0372384 A1* | 12/2014 | Long | G06F 17/30289 707/679 |
| 2016/0170844 A1* | 6/2016 | Long | G06F 11/1469 707/679 |

FOREIGN PATENT DOCUMENTS

| | | |
|---|---|---|
| CN | 102681845 A | 9/2012 |
| CN | 102685158 A | 9/2012 |
| CN | 102870373 A | 1/2013 |
| CN | 102946411 A | 2/2013 |
| JP | 2009-80695 A | 4/2009 |
| JP | 2012-244463 A | 12/2012 |
| KR | 10-2015-0046372 | 4/2015 |
| WO | WO 2004/025923 A1 | 3/2004 |
| WO | WO 2014/040535 A1 | 3/2014 |

* cited by examiner

METHOD AND APPARATUS FOR CELL CONFIGURATION

CROSS-REFERENCE TO RELATED APPLICATION

This application claims priority to Chinese Patent Application No. 201310268703.8, filed on Jun. 28, 2013, which is hereby incorporated by reference in its entirety.

TECHNICAL FIELD

The present invention relates to the field of network communications technologies, and in particular, to a method, an apparatus, a terminal, and a server for synchronizing a terminal mirror.

BACKGROUND

With development of intelligent terminals, more application software can run on an intelligent terminal, so that a terminal user can send an email, access a social network, make payment on a terminal, and run various application games by using the intelligent terminal. In a process of running application software by the intelligent terminal, a large amount of user data is generated, including state data generated in real time during runtime of the application software and file data stored on a disk after running of the application software. These data possibly involves privacy of the terminal user. When the intelligent terminal is lost, user data in the intelligent terminal is also lost accordingly, or when the intelligent terminal is infected with malicious software, the user data in the intelligent terminal is at risk. Therefore, in order to protect completeness of data on the intelligent terminal and user privacy, the intelligent terminal may, by performing mirror synchronization with a cloud server, enable the cloud server to obtain the user data on the intelligent terminal, so as to back up the user data of the intelligent terminal and perform security check on the user data by using abundant computing resources on the cloud server.

In the prior art, the intelligent terminal may transmit the file data generated after the running of the application software to the cloud server through a network. However, because real-time state data during the running of the application software cannot be synchronized in such a synchronization manner, the user data backed up by the cloud server is incomplete, and accordingly, security check based on the user data is also inaccurate.

SUMMARY

Embodiments of the present invention provide a method, an apparatus, a terminal, and a server for synchronizing a terminal mirror, so as to resolve a problem of incomplete backup data that is likely to be caused by an existing manner of synchronizing a terminal mirror.

In order to resolve the foregoing technical problem, the embodiments of the present invention disclose the following technical solutions.

According to a first aspect, a method for synchronizing a terminal mirror is provided, including:

obtaining, by a terminal, multiple input events during running of application software;

aggregating, by the terminal, the multiple input events to obtain an aggregate event; and transmitting, by the terminal, the aggregate event to a server, so that after parsing the aggregate event to obtain the multiple input events, the server processes the multiple input events by using a virtual machine that is of the terminal and set on the server, so as to obtain user data generated during the running of the application software.

With reference to the first aspect, in a first possible implementation manner of the first aspect, before the aggregating, by the terminal, the multiple input events, the method further includes: inserting, by the terminal, the obtained input events into an event queue according to an event generating sequence; where correspondingly, the aggregating, by the terminal, the multiple input events to obtain an aggregate event includes:

aggregating, by the terminal, the input events in the event queue according to a set time period to obtain the aggregate event.

With reference to the first aspect or the first possible implementation manner of the first aspect, in a second possible implementation manner of the first aspect, the aggregating, by the terminal, the multiple input events to obtain an aggregate event includes:

obtaining, by the terminal, one current input event according to a generating sequence of the multiple input events;

generating, by the terminal, bitmap information for each piece of attribute information of the current input event, where the bitmap information of each piece of attribute information is used to indicate whether the attribute information is the same as corresponding attribute information of a preceding input event of the current input event;

determining, by the terminal, the bitmap information and attribute information, which is different from that of the preceding input event, of the current input event as data to be transmitted of the current input event; and combining, by the terminal after determining data to be transmitted of each input event of the multiple input events, the data to be transmitted of the multiple input events to form the aggregate event of the multiple input events.

With reference to the first aspect, the first possible implementation manner of the first aspect, or the second possible implementation manner of the first aspect, in a third possible implementation manner of the first aspect, after the aggregating, by the terminal, the multiple input events to obtain an aggregate event, the method further includes:

compressing, by the terminal, the aggregate event to obtain a compressed aggregate event; where correspondingly, the transmitting, by the terminal, the aggregate event to a server includes:

transmitting, by the terminal, the compressed aggregate event to the server.

According to a second aspect, a method for synchronizing a terminal mirror is provided, where the method includes:

receiving, by a server, an aggregate event transmitted by a terminal, where the aggregate event is an aggregate event obtained by the terminal by aggregating multiple input events after obtaining the multiple input events during running of application software;

parsing, by the server, the aggregate event to obtain the multiple input events; and processing, by the server, the multiple input events by using a virtual machine that is of the terminal and set on the server to obtain user data generated during the running of the application software.

With reference to the second aspect, in a first possible implementation manner of the second aspect, the receiving, by a server, an aggregate event transmitted by a terminal includes: receiving, by the server, a compressed aggregate event transmitted by the terminal, where the compressed aggregate event is an event obtained by the terminal after compressing the aggregate event; where before the parsing, by the server, the aggregate event, the method further includes:

decompressing, by the server, the compressed aggregate event to obtain the aggregate event.

With reference to the second aspect or the first possible implementation manner of the second aspect, in a second possible implementation manner of the second aspect, the parsing, by the server, the aggregate event to obtain the multiple input events includes:

obtaining, by the server, transmitted data of one current input event from the aggregate event in order, where the transmitted data includes bitmap information of each piece of attribute information of the current input event and attribute information, which is different from that of a preceding input event, of the current input event, where the bitmap information of each piece of attribute information is used to indicate whether the attribute information is the same as corresponding attribute information of the preceding input event;

obtaining, by the server according to indication of the bitmap information, attribute information, which is the same as that of the preceding input event, of the current input event from the attribute information of the preceding input event; and combining, by the server, the obtained same attribute information and the different attribute information included in the transmitted data to form the current input event.

With reference to the second aspect, the first possible implementation manner of the second aspect, or the second possible implementation manner of the second aspect, in a third possible implementation manner of the second aspect, the processing, by the server, the multiple input events by using a virtual machine that is of the terminal and set on the server includes:

when the server receives a notification indicating that a change occurs on a system state of the virtual machine that is of the terminal and set on the server, determining whether the attribute information of the multiple input events matches the system state; and inserting, by the server, an input event corresponding to attribute information that matches the system state into a system of the virtual machine, so that the system invokes a processing function to process the input event.

According to a third aspect, an apparatus for synchronizing a terminal mirror is provided, where the apparatus includes:

an obtaining unit, configured to obtain multiple input events during running of application software;

an aggregating unit, configured to aggregate the multiple input events obtained by the obtaining unit, so as to obtain an aggregate event; and a transmitting unit, configured to transmit the aggregate event obtained by the aggregating unit to a server, so that after parsing the aggregate event to obtain the multiple input events, the server processes the multiple input events by using a virtual machine that is of the terminal and set on the serve, so as to obtain user data generated during the running of the application software.

With reference to the third aspect, in a first possible implementation manner of the third aspect, the apparatus further includes:

an inserting unit, configured to insert the input events obtained by the obtaining unit into an event queue according to an event generating sequence; where the aggregating unit is specifically configured to aggregate the input events in the event queue according to a set time period to obtain the aggregate event.

With reference to the third aspect or the first possible implementation manner of the third aspect, in a second possible implementation manner of the third aspect, the aggregating unit includes:

an event obtaining subunit, configured to obtain one current input event according to a generating sequence of the multiple input events;

an information generating subunit, configured to generate bitmap information for each piece of attribute information of the current input event obtained by the event obtaining subunit, where the bitmap information of each piece of attribute information is used to indicate whether the attribute information is the same as corresponding attribute information of a preceding input event of the current input event;

a data determining subunit, configured to determine the bitmap information, which is generated by the information generating subunit, of the current input event and attribute information that is different from that of the preceding input event as data to be transmitted of the current input event; and an event aggregating subunit, configured to combine, after the data determining subunit determines the data to be transmitted of each input event of the multiple input events, the data to be transmitted of the multiple input events to form the aggregate event of the multiple input events.

With reference to the third aspect, the first possible implementation manner of the third aspect, or the second possible implementation manner of the third aspect, in a third possible implementation manner of the third aspect, the apparatus further includes:

a compressing unit, configured to compress the aggregate event obtained by the aggregating unit, so as to obtain a compressed aggregate event; where the transmitting unit is specifically configured to transmit the compressed aggregate event obtained by the compressing unit to a cloud server.

According to a fourth aspect, an apparatus for synchronizing a terminal mirror is provided, where the apparatus includes:

a receiving unit, configured to receive an aggregate event transmitted by a terminal, where the aggregate event is an aggregate event obtained by the terminal by aggregating multiple input events after obtaining the multiple input events during running of application software;

a parsing unit, configured to parse the aggregate event received by the receiving unit, so as to obtain the multiple input events; and a processing unit, configured to process, by using a virtual machine that is of the terminal and set on the server, the multiple input events obtained by the parsing unit, so as to obtain user data generated during the running of the application software.

With reference to the fourth aspect, in a first possible implementation manner of the fourth aspect, the receiving unit is specifically configured to receive a compressed aggregate event transmitted by the terminal, where the compressed aggregate event is an event obtained by the terminal after compressing the aggregate event; where the apparatus further includes a decompressing unit, configured to decompress the compressed aggregate event received by the receiving unit, so as to obtain the aggregate event.

With reference to the fourth aspect or the first possible implementation manner of the fourth aspect, in a second possible implementation manner of the fourth aspect, the receiving unit is specifically configured to receive the compressed aggregate event transmitted by the terminal, where the compressed aggregate event is an event obtained by the terminal after compressing the aggregate event; where the apparatus further includes a decompressing unit, configured to decompress the compressed aggregate event received by the receiving unit, so as to obtain the aggregate event.

With reference to the fourth aspect, the first possible implementation manner of the fourth aspect, or the second possible implementation manner of the fourth aspect, in a third possible implementation manner of the fourth aspect, the processing unit includes:

a state matching subunit, configured to: when a notification indicating that a change occurs on a system state of the virtual machine that is of the terminal and set on the server is received, determine whether the attribute information of the multiple input events matches the system state; and an event processing subunit, configured to: according to a matching result of the state matching subunit, insert an input event corresponding to attribute information that matches the system state into a system of the virtual machine, so that the system invokes a processing function to process the input event.

According to a fifth aspect, a terminal is provided, where the terminal includes: a processor and a network interface, where the processor is configured to obtain multiple input events during running of application software, and aggregate the multiple input events to obtain an aggregate event; and the network interface is configured to transmit the aggregate event to a server, so that after parsing the aggregate event to obtain the multiple input events, the server processes the multiple input events by using a virtual machine that is of the terminal and set on the server, so as to obtain user data generated during the running of the application software.

With reference to the fifth aspect, in a first possible implementation manner of the fifth aspect, the processor is further configured to inset the obtained input events into an event queue according to an event generating sequence; and the processor is specifically configured to aggregate the input events in the event queue according to a set time period to obtain the aggregate event.

With reference to the fifth aspect or the first possible implementation manner of the fifth aspect, in a second possible implementation manner of the fifth aspect, the processor is specifically configured to: obtain one current input event according to a generating sequence of the multiple input events; generate bitmap information for each piece of attribute information of the current input event, where the bitmap information of each piece of attribute information is used to indicate whether the attribute information is the same as corresponding attribute information of a preceding input event of the current input event; determine the bitmap information and attribute information, which is different from that of the preceding input event, of the current input event as data to be transmitted of the current input event; and after determining the data to be transmitted of each input event of the multiple input events, combine the data to be transmitted of the multiple input events to form the aggregate event of the multiple input events.

With reference to the fifth aspect, the first possible implementation manner of the fifth aspect, or the second possible implementation manner of the fifth aspect, in a third possible implementation manner of the fifth aspect, the processor is further configured to compress the aggregate event to obtain a compressed aggregate event; and the network interface is specifically configured to transmit the compressed aggregate event to a cloud server.

According to a sixth aspect, a server is provided, where the server includes a terminal interface and a processor, where the terminal interface is configured to receive an aggregate event transmitted by a terminal, where the aggregate event is an aggregate event obtained by the terminal by aggregating multiple input events after obtaining the multiple input events during running of application software; and the processor is configured to parse the aggregate event to obtain the multiple input events, and process the multiple input events by using a virtual machine that is of the terminal and set on the server to obtain user data generated during the running of the application software.

With reference to the sixth aspect, in a first possible implementation manner of the sixth aspect, the terminal interface is specifically configured to receive a compressed aggregate event transmitted by the terminal, where compressed aggregate event is an event obtained by the terminal after compressing the aggregate event; and the processor is further configured to decompress the compressed aggregate event to obtain the aggregate event.

With reference to the sixth aspect or the first possible implementation manner of the sixth aspect, in a second possible implementation manner of the sixth aspect, the processor is specifically configured to: obtain transmitted data of one current input event from the aggregate event in order, where the transmitted data includes bitmap information of each piece of attribute information of the current input event and attribute information, which is different from that of a preceding input event, of the current input event, where the bitmap information of each piece of attribute information is used to indicate whether the attribute information is the same as corresponding attribute information of the preceding input event; obtain, according to indication of the bitmap information, attribute information, which is the same as that of the preceding input event, of the current input event from the attribute information of the preceding input event; and combine the obtained same attribute information and the different attribute information included in the transmitted data to form the current input event.

With reference to the sixth aspect, the first possible implementation manner of the sixth aspect, or the second possible implementation manner of the sixth aspect, in a third possible implementation manner of the sixth aspect, the processor is specifically configured to: when a notification indicating that a change occurs on a system state of a virtual machine that is of the terminal and set on the server is received, determine whether the attribute information of the multiple input events matches the system state; and insert an input event corresponding to attribute information that matches the system state into a system of the virtual machine, so that the system invokes a processing function to process the input event.

In the embodiments of the present invention, a terminal obtains multiple input events during running of application software, aggregates the multiple input events to obtain an aggregate event, and transmits the aggregate event to a server; after parsing the aggregate event to obtain the multiple input events, the server processes the multiple input events by using a virtual machine that is of the terminal and set on the server, so as to obtain the user data generated during the running of the application software. In the embodiments of the present invention, the terminal does not need to transmit the user data to the server, but transmits the input events to the server in an event-driven manner, so that a server end triggers execution of the input events by using the virtual machine of the terminal, so as to obtain the user data that is the same as that on a terminal side that runs the application software, thereby ensuring that the server can back up complete user data and improving accuracy of security check on the user data. Moreover, because a size of aggregated input events transmitted by the terminal is small, compared with that for directly transmitting the user data, less network transmission resources are occupied and a performance overhead of the terminal itself is not affected, which ensures normal running of other services on the terminal.

BRIEF DESCRIPTION OF DRAWINGS

To describe the technical solutions in the embodiments of the present invention more clearly, the following briefly introduces the accompanying drawings required for describing the embodiments. Apparently, a person of ordinary skill in the art may still derive other drawings from these accompanying drawings without creative efforts.

DESCRIPTION OF EMBODIMENTS

In order to enable a person skilled in the art to have a better understanding of technical solutions in the embodiments of the present invention and make the objectives, features, and advantages of the embodiments of the present invention more comprehensible, the technical solutions in the embodiments of the present invention are further described in detail in the following with reference to the accompanying drawings.

Figure 1A:
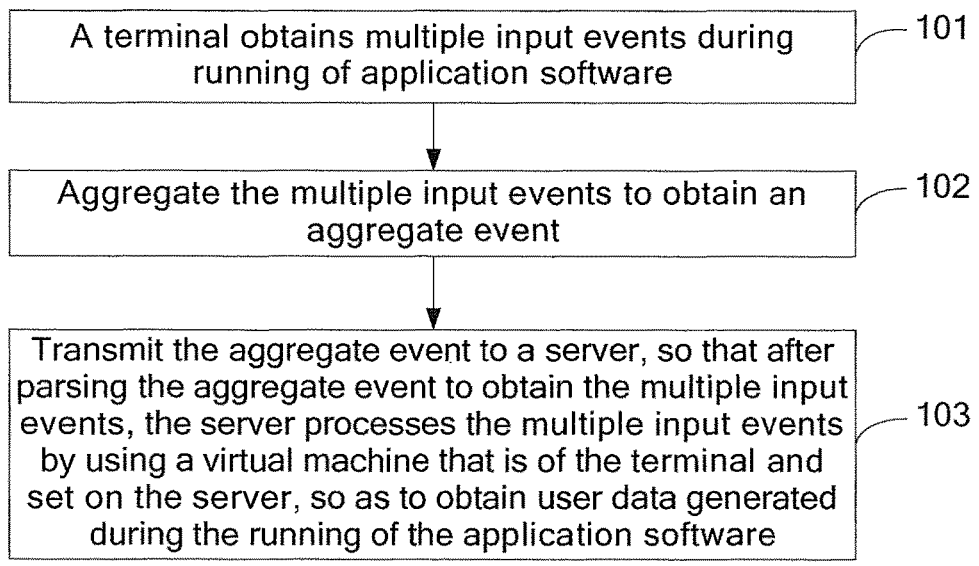
FIG. 1A is a flowchart of an embodiment of a method for synchronizing a terminal mirror according to the present invention.

Refer to FIG. 1A, which is a flowchart of an embodiment of a method for synchronizing a terminal mirror according to the present invention. In the embodiment, a synchronization process is described on a terminal side.

Step 101: A terminal obtains multiple input events during running of application software.

In the embodiment, the terminal may refer to various smartphones, tablet computers, and the like. Different application software on the terminal may trigger an input event of a different type during runtime. These input events may include a touch input event for performing an operation on a display screen, a positioning input event generated by a Global Positioning System (GPS) device, a sensing input event generated by a sensor, and the like. For example, a terminal user, when attempting to run a piece of application software, clicks an icon of the application software on a touch display screen of the terminal, where an action of clicking the icon may be abstracted into one input event. When the terminal user performs an operation on the started application software, different input events are also triggered according to different input gestures in an operation process.

Step 102: Aggregate the multiple input events to obtain an aggregate event.

In the embodiment, the terminal may obtain one current input event according to a generating sequence of the multiple input events; generate bitmap information for each piece of attribute information of the current input event, where the bitmap information of each piece of attribute information is used to indicate whether the attribute information is the same as corresponding attribute information of a preceding input event of the current input event; determine the bitmap information and attribute information, which is different from that of the preceding input event, of the current input event as data to be transmitted of the current input event; and after determining the data to be transmitted of each input event of the multiple input events, combine the data to be transmitted of the multiple input events to form the aggregate event of the multiple input events.

Step 103: Transmit the aggregate event to a server, so that after parsing the aggregate event to obtain the multiple input events, the server processes the multiple input events by using a virtual machine that is of the terminal and set on the server, so as to obtain user data generated during the running of the application software.

It can be seen that in the embodiment, a terminal does not need to transmit user data to a server, but transmits input events to the server in an event-driven manner, so that a server end triggers execution of the input events by using a virtual machine of the terminal, so as to obtain user data that is the same as that on a terminal side that runs application software, thereby ensuring that the server can back up complete user data and improving accuracy of security check on the user data. Moreover, because a size of an aggregated input event transmitted by the terminal is relatively small, compared with that for directly transmitting the user data, less network transmission resources are occupied and a performance overhead of the terminal itself is not affected, which ensures normal running of other services on the terminal.

Figure 1B:
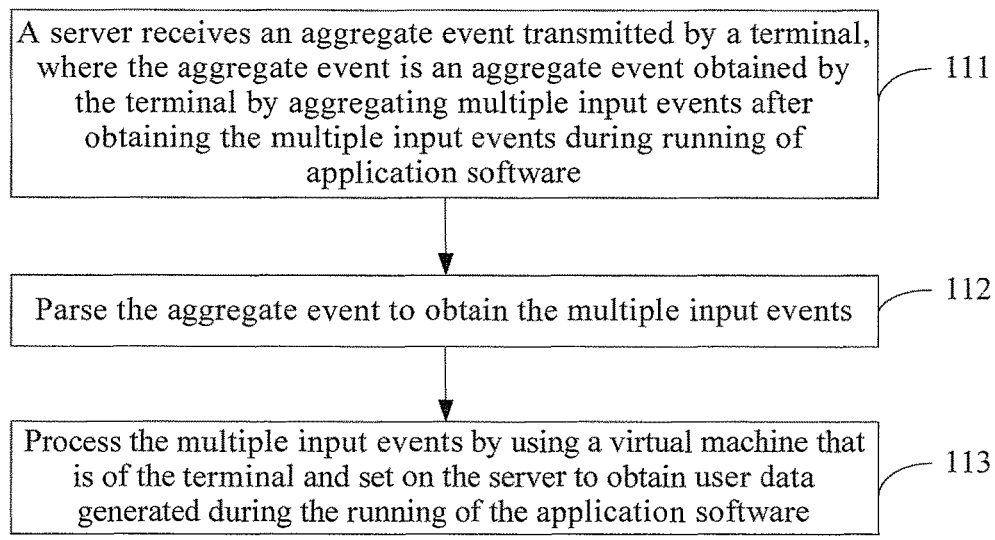
FIG. 1B is a flowchart of another embodiment of a method for synchronizing a terminal mirror according to the present invention.

Refer to FIG. 1B, which is a flowchart of another embodiment of a method for synchronizing a terminal mirror according to the present invention. In the embodiment, a synchronization process is described on a server side.

Step 111: A server receives an aggregate event transmitted by a terminal, where the aggregate event is an aggregate event obtained by the terminal by aggregating multiple input events after obtaining the multiple input events during running of application software.

In the embodiment, the server may refer to a cloud server having abundant computing resources, where a virtual machine of each terminal that communicates with the cloud server may be set on the cloud server. A virtual machine refers to a complete system that is simulated by software, has complete hardware system functions, and runs in a completely isolated environment. Generally, a virtual machine of multiple different terminals may be simulated on one cloud server, and the terminal may access the virtual machine that is of the terminal and on the cloud server through a network.

Step 112: Parse the aggregate event to obtain the multiple input events.

In the embodiment, the server may obtain transmitted data of one current input event from the aggregate event in order, where the transmitted data includes bitmap information of each piece of attribute information of the current input event and attribute information, which is different from that of a preceding input event, of the current input event, where the bitmap information of each piece of attribute information is used to indicate whether the attribute information is the same as corresponding attribute information of the preceding input event; obtain, according to indication of the bitmap information, attribute information, which is the same as that of the preceding input event, of the current input event from the attribute information of the preceding input event; and combine the obtained same attribute information and the different attribute information included in the transmitted data to form the current input event.

Step 113: Process the multiple input events by using a virtual machine that is of the terminal and set on the server to obtain user data generated during the running of the application software.

In the embodiment, when receiving a notification indicating that a change occurs on a system state of the virtual machine that is of the terminal and set on the server, the server determines whether the attribute information of the multiple input events matches the system state; and inserts an input event corresponding to attribute information that matches the system state into a system of the virtual machine, so that the system of the virtual machine invokes a processing function to process the input event, so as to obtain the user data generated during the running of the application software.

It can be seen that in the embodiment, a terminal does not need to transmit user data to a server, but transmits input events to the server in an event-driven manner, so that a server end triggers execution of the input events by using a virtual machine of the terminal, so as to obtain the user data that is the same as that on a terminal side that runs application software, thereby ensuring that the server can back up complete user data and improving accuracy of security check on the user data. Moreover, because a size of an aggregated input event transmitted by the terminal is relatively small, compared with that for directly transmitting the user data, less network transmission resources are occupied and a performance overhead of the terminal itself is not affected, which ensures normal running of other services on the terminal.

Figure 2:
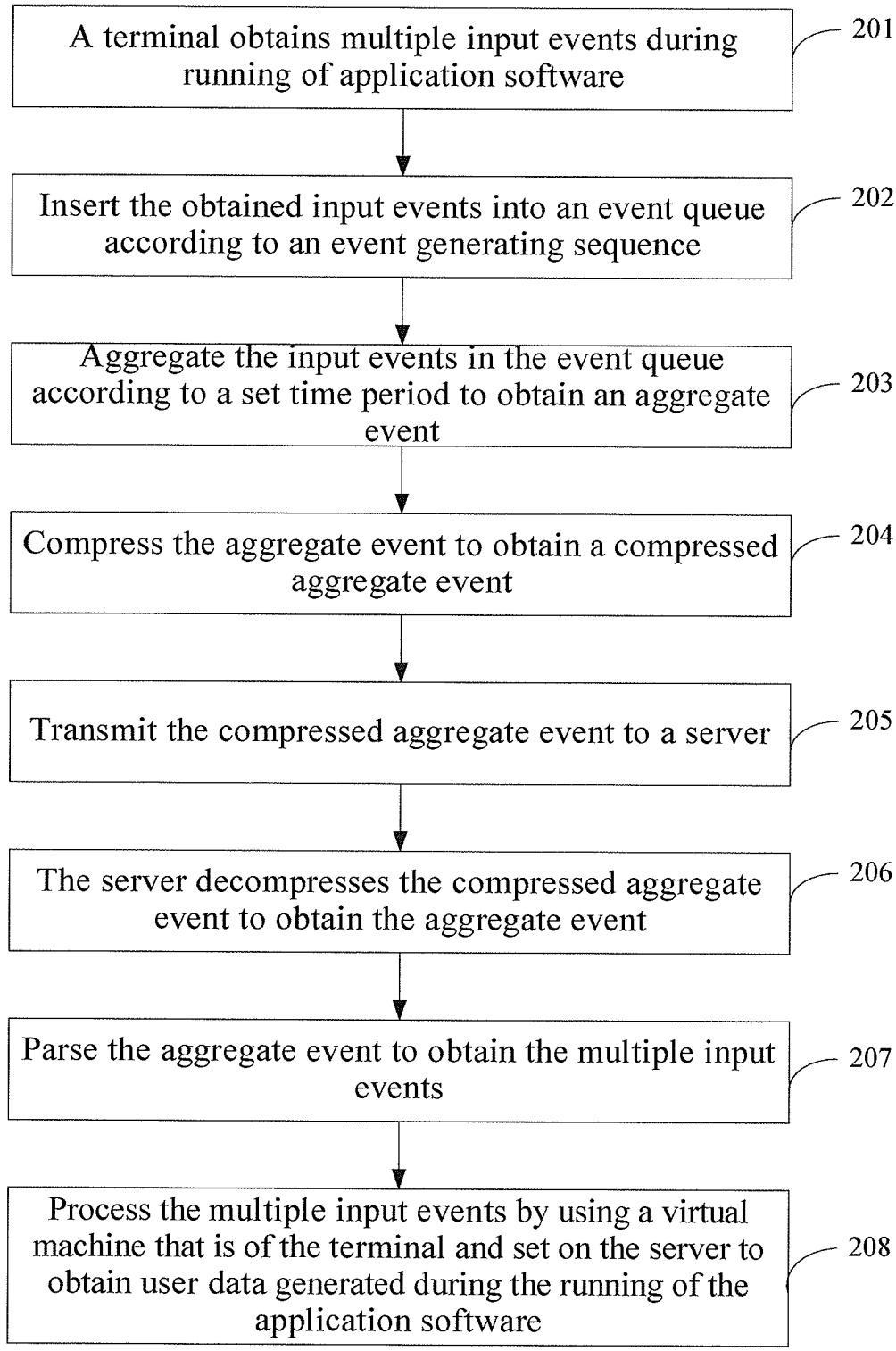
FIG. 2 is a flowchart of another embodiment of a method for synchronizing a terminal mirror according to the present invention.

Refer to FIG. 2, which is a flowchart of another embodiment of a method for synchronizing a terminal mirror according to the present invention. In the embodiment, a synchronization process is described by means of interaction between a terminal and a server.

Step 201: A terminal obtains multiple input events during running of application software.

Different application software on the terminal may trigger an input event of a different type during runtime. These input events may include a touch input event for performing an operation on a display screen, a positioning input event generated by a GPS device, a sensing input event generated by a sensor, and the like. Attribute information included in an input event is different depending on a different type of the input event. For example, for a touch input event, attribute information included in the touch input event may include contact coordinates of touching, a touch event type, occurrence time, and the like. For a positioning input event, attribute information included in the positioning input event may include position information, occurrence time, and the like.

Step 202: Insert the obtained input events into an event queue according to an event generating sequence.

In the embodiment, in a process of running the application software, each time one input event is generated, the input event may be inserted into the event queue, where the event queue may be stored in memory of the terminal, and input events in the event queue are sorted in a first in first out manner. Accordingly, the terminal may obtain the input event from the event queue in order, and process the input event by invoking a processing function that corresponds to the input event, so as to execute the application software on the terminal.

Step 203: Aggregate the input events in the event queue according to a set time period to obtain an aggregate event.

The terminal may write the input events stored in the event queue of the memory into a disk in an asynchronous processing manner. Moreover, in the embodiment, the terminal may aggregate the multiple input events in the event queue according to a set time period to obtain the aggregate event. It should be noted that, in addition to aggregating the input events according to the time period, an event threshold may also be set, and when the number of input events in the event queue reaches the event threshold, the input events are aggregated. This embodiment of the present invention has no limitation thereon.

In the embodiment, because the multiple input events in the event queue are sorted in a first in first out order, and multiple consecutive input events generally are events triggered for executing the same application software, two adjacent input events generally have some same attribute information. Therefore, when a following input event is being transmitted, only attribute information that is different from that of a preceding input event may be transmitted. On this basis, the terminal may, when aggregating the multiple input events in the event queue, obtain one current input event according to a generating sequence of the multiple input events; generate bitmap information for each piece of attribute information of the current input event, where the bitmap information of each piece of attribute information is used to indicate whether the attribute information is the same as corresponding attribute information of a preceding attribute information of the current input event; determine the bitmap information of the current input event and attribute information that is different from that of the preceding input event as data to be transmitted of the current input event; and after determining the data to be transmitted of each input event of the multiple input events, combine the data to be transmitted of the multiple input events to form the aggregate event of the multiple input events.

Step 204: Compress the aggregate event to obtain a compressed aggregate event.

In the embodiment, the aggregate event may be compressed to further reduce a size of a data flow of the aggregate event to be transmitted. A compression manner may be ZIP compression, RAR compression, or the like. This embodiment of the present invention has no limitation thereon.

Step 205: Transmit the compressed aggregate event to a server.

Step 206: The server decompresses the compressed aggregate event to obtain the aggregate event.

In this step, a manner in which the server decompresses the compressed aggregate event after receiving the compressed aggregate event transmitted by the terminal is consistent with a manner in which the terminal compresses the aggregate event in step 204. After the compressed aggregate event is decompressed, the aggregate event may be obtained.

Step 207: Parse the aggregate event to obtain the multiple input events.

With reference to a process in which the terminal aggregates the input events to obtain the aggregate event in step 203, in this step, the server may obtain transmitted data of one current input event from the aggregate event in order, where the transmitted data includes bitmap information of each piece of attribute information of the current input event and attribute information, which is different from that of the preceding input event, of the current input event, where the bitmap information of each piece of attribute information is used to indicate whether the attribute information is the same as the corresponding attribute information of the preceding attribute information; obtain, according to indication of the bitmap information, attribute information, which is the same as that of the preceding input event, of the current input event from the attribute information of the preceding input event; and combine the obtained same attribute information and the different attribute information included in the transmitted data to form the current input event.

Step 208: Process the multiple input events by using a virtual machine that is of the terminal and set on the server to obtain user data generated during the running of the application software.

In this step, when the server receives a notification indicating that a change occurs on a system state of the virtual machine that is of the terminal and set on the server, the server determines whether the attribute information of the multiple input events matches the system state; and inserts an input event corresponding to attribute information that matches the system state into a system of the virtual machine, so that the system of the virtual machine invokes a processing function to process the input event, where the processing process is the same as the process of processing the input event in the terminal by invoking the processing function. That is, a process of executing the application software in the virtual machine of the terminal on the server is the same as that in the terminal. Accordingly, user data generated on the virtual machine of the terminal is the same as the user data generated by the terminal, thereby achieving an objective of synchronizing a terminal mirror on the server.

Attribute information of the input event generally includes multiple pieces. Attribute information that matches the system state of the virtual machine of the terminal may be at least one piece of the multiple pieces of attribute information. For example, for a touch input event, it may be determined whether occurrence time in attribute information thereof is the same as current time of a system of the virtual machine of the terminal, and if the occurrence time in attribute information thereof is the same as the current time of the system of the virtual machine of the terminal, the touch input event is inserted into the system.

It can be seen that in the embodiment, a terminal does not need to transmit user data to a server, but transmits input events to the server in an event-driven manner, so that a server end triggers execution of the input events by using a virtual machine of the terminal, so as to obtain the user data that is the same as that on a terminal side that runs application software, thereby ensuring that the server can back up complete user data and improving accuracy of security check on the user data. Moreover, because a size of an aggregated input event transmitted by the terminal is relatively small, compared with that for directly transmitting the user data, less network transmission resources are occupied and a performance overhead of the terminal itself is not affected, which ensures normal running of other services on the terminal.

Figure 3A:
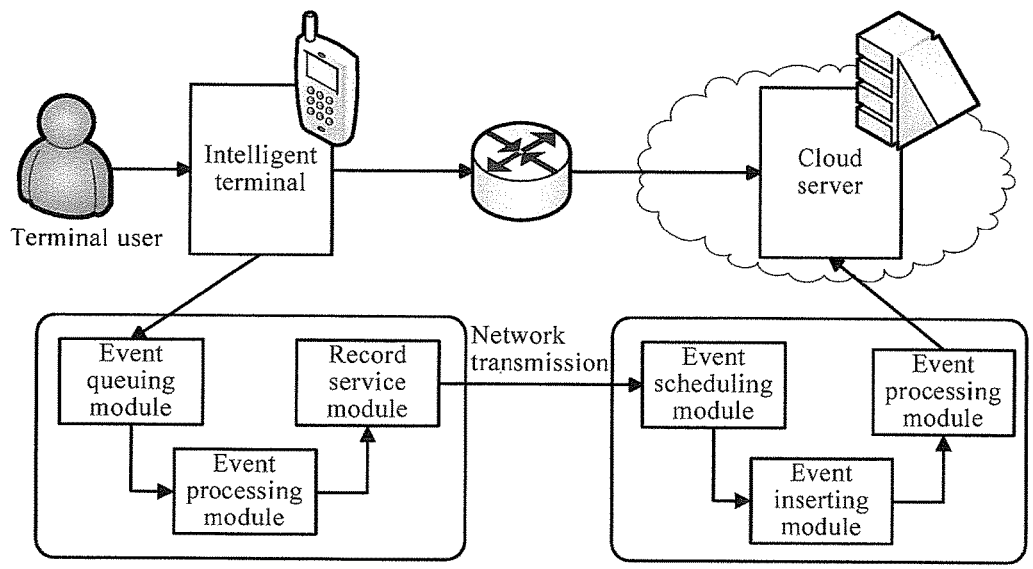
FIG. 3A is a schematic diagram of a network architecture that applies an embodiment of the present invention.

Refer to FIG. 3A, which is a schematic diagram of a network architecture according to an embodiment of the present invention.

The network architecture shown in FIG. 3A includes an intelligent terminal used by a user and a cloud server, where the intelligent terminal and the cloud server communicate through a network. The intelligent terminal includes an event queuing module, an event processing module, and a record service module. The cloud server includes an event scheduling module, an event inserting module, and an event processing module.

Assume that the intelligent terminal shown in FIG. 3A has a touch display screen. The following describes a process of synchronizing a terminal mirror from the intelligent terminal to the cloud server by using an example in which a user clicks an icon of application software on the touch display screen.

On an intelligent terminal side:

The user clicks, when attempting to run the application software, the icon of the application software on the touch display screen. In such a case, the event queuing module may abstract the user's action of clicking the icon into one input event by using a kernel driver, and insert the input event into an event queue inside the intelligent terminal. Later, when the user performs an operation on the started application software, a different input event is correspondingly triggered in an operation process, and these input events are inserted into the event queue inside intelligent terminal, where the input events in the event queue are sorted in a first in first out manner.

The event processing module may obtain an input event from the event queue in order by using an event processing thread, and process the input event by invoking a processing function corresponding to the input event, so as to execute the application software on the intelligent terminal. Moreover, the event processing module may also send the input events in the event queue to the record service module in an asynchronous processing manner.

The record service module may, after obtaining the multiple input events, aggregate and compress these input events to obtain a compressed aggregate event, and transmit the compressed aggregate event to the cloud server through the network. In the embodiment, the record service module may aggregate and compress the obtained input events according to a set time period. For example, it may be set that the obtained input events are aggregated and compressed at an interval of 5s.

Figure 3B:
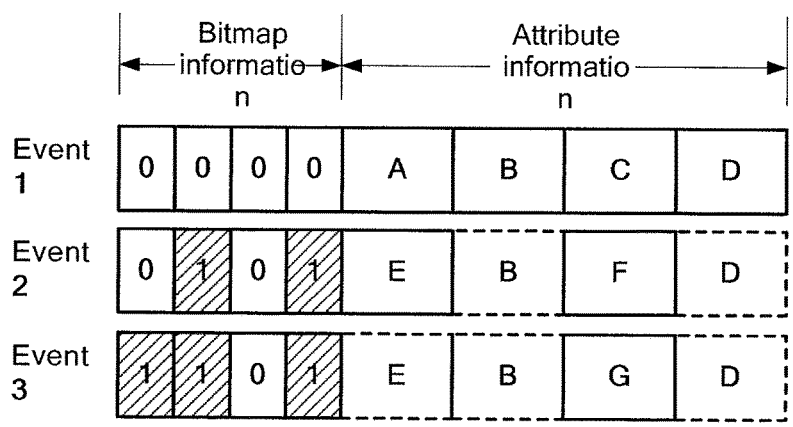
FIG. 3B is a schematic diagram illustrating event aggregation that applies an embodiment of the present invention.

When the record service module aggregates the input events, because the multiple input events obtained by the record service module are sorted in the first in first out order in the event queue and multiple consecutive input events generally are events triggered for executing the same application software, two adjacent input events generally have some same attribute information. Therefore, when a following input event is transmitted, it is allowed that only attribute information that is different from that of a preceding input event thereof is transmitted, thereby reducing a size of an entire compressed aggregate event and reducing network resources occupied for transmitting the compressed aggregate event. As shown in FIG. 3B, assume that the record service module transmits three input events this time, which are event 1, event 2, and event 3, where each input event is formed by four pieces of attribute information. A header of each input event has bitmap information respectively corresponding to each piece of attribute information. A bit value of each piece of bitmap information is used to indicate whether the attribute information corresponding to the bitmap information is the same as attribute information of a preceding input event. For example, if the attribute information corresponding to the bitmap information is the same as the attribute information of a preceding input event, the bit value of the bitmap information is 1; and if the attribute information corresponding to the bitmap information is different from the attribute information of a preceding input event, the bit value of the bitmap information is 0. With reference to FIG. 3B, it can be learnt that four pieces of attribute information of event 1 respectively are A, B, C, and D. Assume that none of the four attributes of event 1 is the same as those of a preceding event. Accordingly, all bit values of bitmap information of the four pieces of attribute information of the event 1 are 0. For event 2, a second piece of attribute information and a fourth piece of attribute information thereof are the same as those of event 1, and a first piece of attribute information and a third piece of attribute information are different from those of event 1, which respectively are E and F. Therefore, four bit values of bitmap information of event 2 are 0, 1, 0, and 1. For event 3, a first piece of attribute information, a second piece of attribute information, and a fourth piece of attribute information thereof are the same as those of event 2, and a third piece of attribute information is different from that of event 2, which is G. Therefore, four bit values of bitmap information of event 3 are 1, 1, 0, and 1. It can be learnt from the foregoing description that, when the three input events shown in FIG. 3B are transmitted, although the three input events have a total of 12 pieces of attribute information, by setting the bitmap information for each event, only seven pieces of attribute information need to be transmitted actually. Because the bitmap information occupies a smaller bit volume, a size of an overall bit flow for transmitting the three input events is reduced.

Further, for a bit flow of aggregated input events to be transmitted, the record service module may compress the data flow, so as to further reduce the size of the data flow. A compression manner may be using zip compression, rar compression, or the like. This embodiment of the present invention has no limitation thereon.

On a cloud server side:

The event scheduling module decompresses, after receiving the data flow of the aggregated and compressed input events transmitted by the record service module of the intelligent terminal, the data flow to obtain the aggregated input events, and then parses the aggregated input events to obtain the multiple input events.

A manner in which the event scheduling module decompresses the data flow is consistent with a manner in which the record service module compresses the data flow. When the event scheduling module parses the decompressed aggregated input events, with reference to FIG. 3B, it can be learnt that after the attribute information and the bitmap information of the three input events are obtained, except for the event 1, each of the following input events may be restored according to the bitmap information of the input event and the attribute information of the preceding input event of the input event. For example, for event 2, it can be learned according to the bit values "0101" of the bitmap information thereof, the second piece of attribute information and the fourth piece of attribute information are the same as those of event 1; therefore, the two pieces of attribute information are obtained from the event 1. For event 3, it can be learned according to the bit values "1101" of the bitmap information thereof, the first piece of attribute information, the second piece of attribute information, and the fourth piece of attribute information thereof are the same as those of event 2; therefore, the three pieces of attribute information are obtained from event 2.

The event inserting module determines whether the attribute information, which is obtained by means of parsing by the event scheduling module, of each input event matches a system state of a virtual machine of the intelligent terminal; and if the attribute information of each input event matches the system state of the virtual machine of the intelligent terminal, inserts the input event into the system. The virtual machine of the intelligent terminal may, when a change occurs on the system state thereof, trigger in a notification manner the event inserting module to match the attribute information of the input event with the system state.

In this embodiment, the attribute information of the input event generally includes multiple pieces. Attribute information that matches the system state of the virtual machine of the intelligent terminal may be at least one piece of the multiple pieces of attribute information. For example, for a touch input event, it may be determined whether occurrence time in attribute information thereof is the same as time of a current system of the virtual machine of the intelligent terminal, and if the occurrence time in the attribute information thereof is the same as the time of the current system of the virtual machine of the intelligent terminal, the touch input event is inserted into the system.

The event processing module processes, after the event inserting module inserts the input event into the system, the input event by invoking a corresponding processing function within the virtual machine of the intelligent terminal, where the processing process is the same as a process of processing the input event by the event processing module by invoking a processing function within the intelligent terminal. That is, the processes of executing the application software within the virtual machine of the intelligent terminal on the cloud server and within the intelligent terminal are the same. Accordingly, user data generated on the virtual machine of the intelligent terminal is also the same as user data generated on the intelligent terminal, thereby achieving an objective of synchronizing a terminal mirror on the cloud server.

By using the foregoing embodiment, the intelligent terminal needs to transmit only the input events to the cloud server to back up user data of the intelligent terminal on the cloud server, so that when the intelligent terminal is lost, all user data, including state data and file data before the loss, of the intelligent terminal may be restored from the cloud server. Alternatively, by using abundant computing resources on the cloud server, security scanning is performed on the user data on the cloud server, so as to obtain a detecting result indicating whether the user data on the intelligent terminal is secure.

Corresponding to the embodiments of the method for synchronizing a terminal mirror according to the present invention, the present invention further provides embodiments of an apparatus, a terminal, and a server for synchronizing a terminal mirror, to execute the method.

Figure 4:
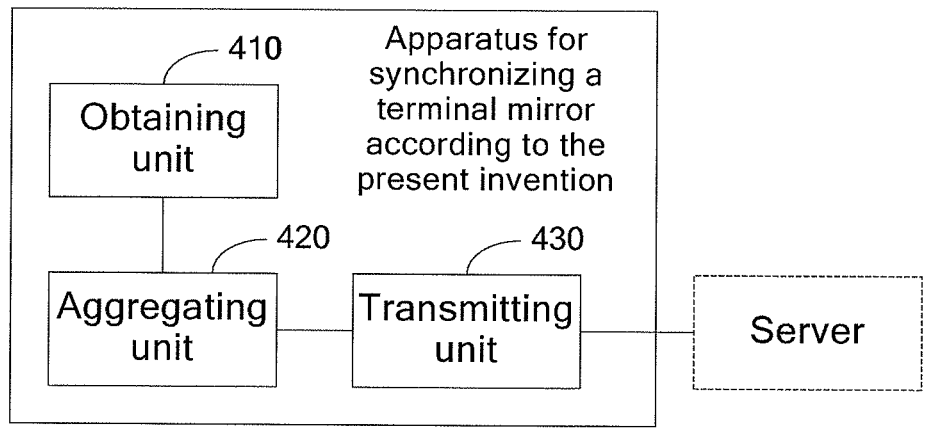
FIG. 4 is a block diagram of an embodiment of an apparatus for synchronizing a terminal mirror according to the present invention.

Refer to FIG. 4, which is a block diagram of an embodiment of an apparatus for synchronizing a terminal mirror according to the present invention. The apparatus may be arranged on a terminal side.

The apparatus includes an obtaining unit 410, an aggregating unit 420, and a transmitting unit 430.

The obtaining unit 410 is configured to obtain multiple input events during running of application software.

The aggregating unit 420 is configured to aggregate the multiple input events obtained by the obtaining unit 410, so as to obtain an aggregate event.

The transmitting unit 430 is configured to transmit the aggregate event obtained by the aggregating unit 420 to a server, so that after parsing the aggregate event to obtain the multiple input events, the server processes the multiple input events by using a virtual machine that is of the terminal and set on the server, so as to obtain user data generated during the running of the application software.

The aggregating unit 420 may include (not shown in FIG. 4):

an event obtaining subunit, configured to obtain one current input event according to a generating sequence of the multiple input events;

an information generating subunit, configured to generate bitmap information for each piece of attribute information of the current input event obtained by the event obtaining subunit, where the bitmap information of each piece of attribute information is used to indicate whether the attribute information is the same as corresponding attribute information of a preceding input event of the current input event;

a data determining subunit, configured to determine the bitmap information, which is generated by the information generating subunit, of the current input event and attribute information that is different from that of the preceding input event as data to be transmitted of the current input event; and an event aggregating subunit, configured to combine, after the data determining subunit determines the data to be transmitted of each input event of the multiple input events, the data to be transmitted of the multiple input events to form the aggregate event of the multiple input events.

Figure 5:
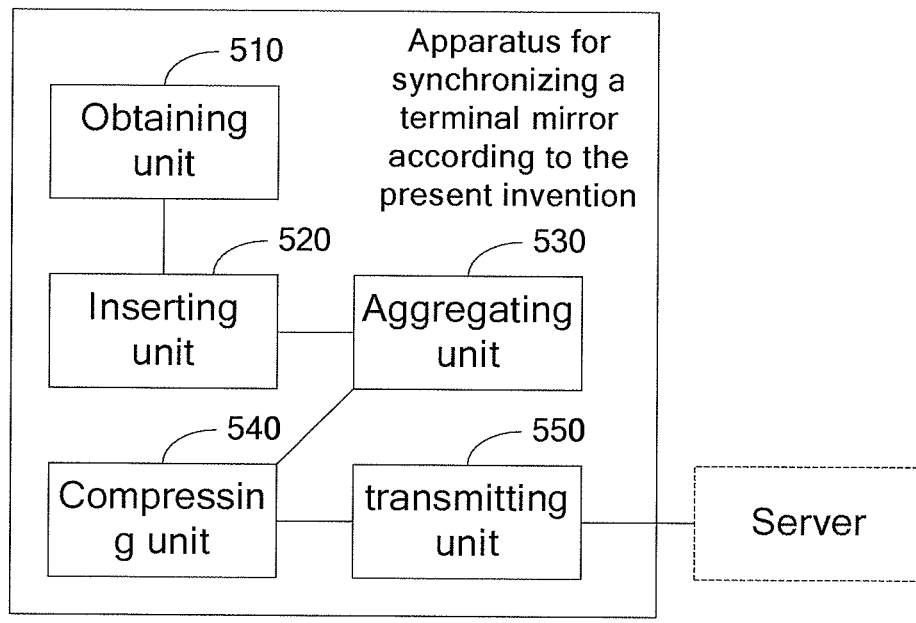
FIG. 5 is a block diagram of another embodiment of an apparatus for synchronizing a terminal mirror according to the present invention.

Refer to FIG. 5, which is a block diagram of another embodiment of an apparatus for synchronizing a terminal mirror according to the present invention. The apparatus may be arranged on a terminal side.

The apparatus includes an obtaining unit 510, an inserting unit 520, an aggregating unit 530, a compressing unit 540, and a transmitting unit 550.

The obtaining unit 510 is configured to obtain multiple input events during running of application software.

The inserting unit 520 is configured to insert the input events obtained by the obtaining unit 510 into an event queue according to an event generating sequence.

The aggregating unit 530 is configured to aggregate the input events in the event queue according to a set time period to obtain the aggregate event.

The compressing unit 540 is configured to compress the aggregate event obtained by the aggregating unit 540, so as to obtain a compressed aggregate event.

The transmitting unit 550 is specifically configured to transmit the compressed aggregate event obtained by the compressing unit 540 to a cloud server, so that after parsing the aggregate event to obtain the multiple input events, the server processes the multiple input events by using a virtual machine that is of the terminal and set on the server, so as to obtain user data generated during the running of the application software.

The aggregating unit 530 may include (not shown in FIG. 5): an event obtaining subunit, configured to obtain one current input event according to a generating sequence of the multiple input events;

an information generating subunit, configured to generate bitmap information for each piece of attribute information of the current input event obtained by the event obtaining subunit, where the bitmap information of each piece of attribute information is used to indicate whether the attribute information is the same as corresponding attribute information of a preceding input event of the current input event;

a data determining subunit, configured to determine the bitmap information, which is generated by the information generating subunit, of the current input event and attribute information that is different from that of the preceding input event as data to be transmitted of the current input event; and an event aggregating subunit, configured to combine, after the data determining subunit determines the data to be transmitted of each input event of the multiple input events, the data to be transmitted of the multiple input events to form the aggregate event of the multiple input events.

Figure 6:
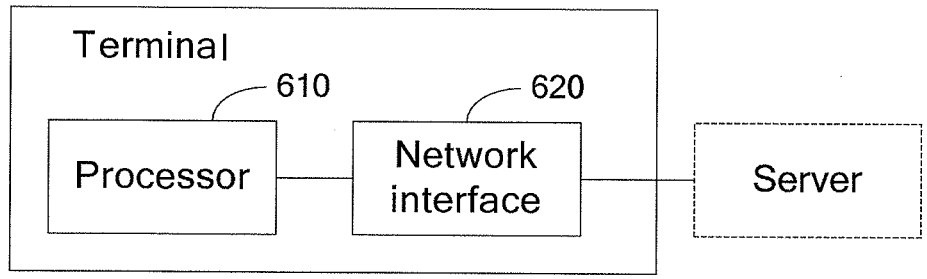
FIG. 6 is a block diagram of an embodiment of a terminal according to the present invention.

Refer to FIG. 6, which is a block diagram of an embodiment of a terminal according to the present invention.

The terminal includes a processor 610 and a network interface 620.

The processor 610 is configured to obtain multiple input events during running of application software, and aggregate the multiple input events to obtain an aggregate event.

The network interface 620 is configured to transmit the aggregate event to a server, so that after parsing the aggregate event to obtain the multiple input events, the server processes the multiple input events by using a virtual machine that is of the terminal and set on the server, so as to obtain user data generated during the running of the application software.

In an optional implementation manner:

the processor 610 may be further configured to insert the obtained input events into an event queue according to an event generating sequence; and the processor 610 may be specifically configured to aggregate the input events in the event queue according to a set time period to obtain the aggregate event.

In another optional implementation manner:

the processor 610 may be specifically configured to: obtain one current input event according to a generating sequence of the multiple input events;

generate bitmap information for each piece of attribute information of the current input event, where the bitmap information of each piece of attribute information is used to indicate whether the attribute information is the same as corresponding attribute information of a preceding input event of the current input event; determine the bitmap information and attribute information, which is different from that of the preceding input event, of the current input event as data to be transmitted of the current input event; and after determining the data to be transmitted of each input event of the multiple input events, combine the data to be transmitted of the multiple input events to form the aggregate event of the multiple input events.

In another optional implementation manner:

the processor 610 may be further configured to compress the aggregate event to obtain a compressed aggregate event;

and the network interface 620 may be specifically configured to transmit the compressed aggregate event to a cloud server.

Figure 7:
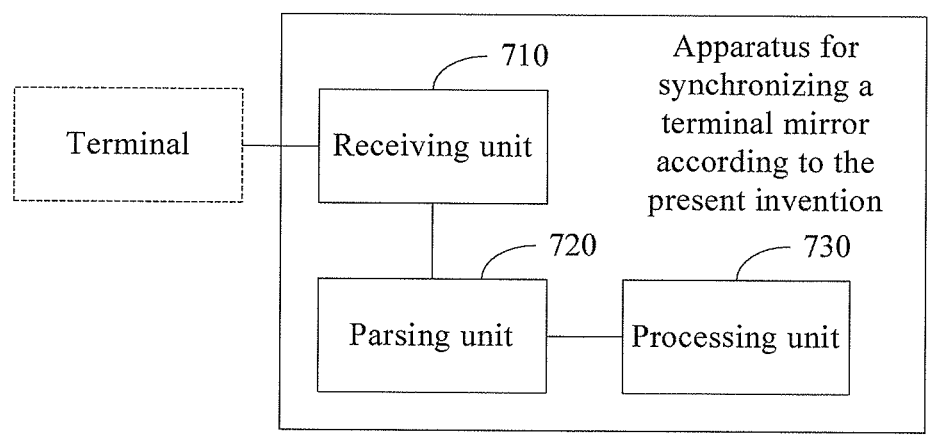
FIG. 7 is a block diagram of another embodiment of an apparatus for synchronizing a terminal mirror according to the present invention.

Refer to FIG. 7, which is a block diagram of another embodiment of an apparatus for synchronizing a terminal mirror according to the present invention. The apparatus may be arranged on a server side.

The apparatus includes a receiving unit 710, a parsing unit 720, and a processing unit 730.

The receiving unit 710 is configured to receive an aggregate event transmitted by a terminal, where the aggregate event is an aggregate event obtained by the terminal by aggregating multiple input events after obtaining the multiple input events during running of application software.

The parsing unit 720 is configured to parse the aggregate event received by the receiving unit 710, so as to obtain the multiple input events.

The processing unit 730 is configured to process, by using a virtual machine that is of the terminal and set on the server, the multiple input events obtained by the parsing unit 720, so as to obtain user data generated during the running of the application software.

The parsing unit 720 may include (not shown in FIG. 7):

a data obtaining subunit, configured to obtain transmitted data of one current input event from the aggregate event in order, where the transmitted data includes bitmap information of each piece of attribute information of the current input event and attribute information, which is different from that of a preceding input event, of the current input event, where the bitmap information of each piece of attribute information is used to indicate whether the attribute information is the same as corresponding attribute information of the preceding input event;

an attribute obtaining subunit, configured to obtain, according to indication of the bitmap information obtained by the data obtaining subunit, attribute information, which is the same as that of the preceding input event, of the current input event from the attribute information of the preceding input event; and an event generating subunit, configured to combine the same attribute information obtained by the attribute obtaining subunit and the different attribute information included in the transmitted data obtained by the data obtaining subunit to form the current input event.

The processing unit 730 may include (not shown in FIG. 7):

a state matching subunit, configured to: when a notification indicating that a change occurs on a system state of the virtual machine that is of the terminal and set on the server is received, determine whether the attribute information of the multiple input events matches the system state; and an event processing subunit, configured to: according to a matching result of the state matching subunit, insert an input event corresponding to attribute information that matches the system state into a system of the virtual machine, so that the system invokes a processing function to process the input event.

Figure 8:
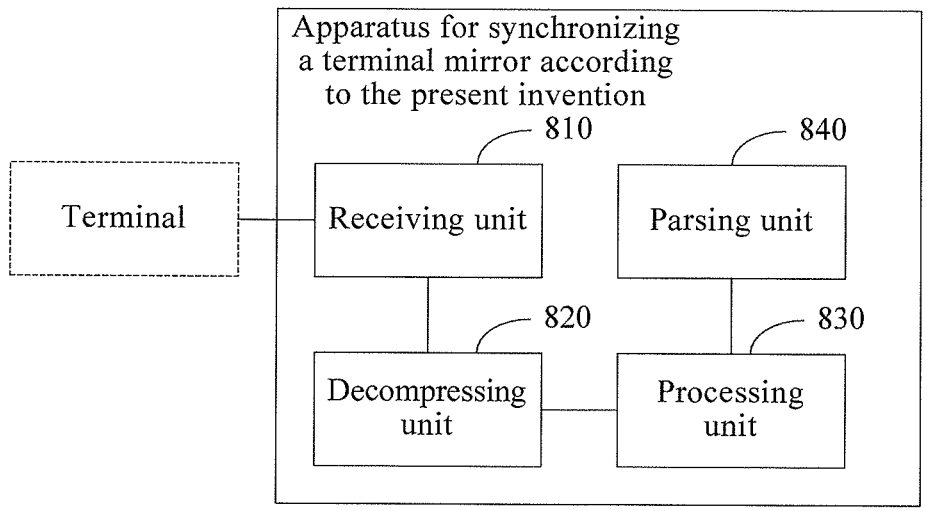
FIG. 8 is a block diagram of another embodiment of an apparatus for synchronizing a terminal mirror according to the present invention.

Refer to FIG. 8, which is a block diagram of another embodiment of an apparatus for synchronizing a terminal mirror according to the present invention. The apparatus may be arranged on a server side.

The apparatus includes a receiving unit 810, a decompressing unit 820, a parsing unit 830, and a processing unit 840.

The receiving unit 810 is configured to receive a compressed aggregate event transmitted by a terminal, where the compressed aggregate event is an event obtained by the terminal by aggregating multiple input events after obtaining the multiple input events during running of application software, and then compressing the aggregate event.

The decompressing unit 820 is configured to decompress the compressed aggregate event received by the receiving unit 810, so as to obtain the aggregate event.

The parsing unit 830 is configured to parse the aggregate event obtained by the decompressing unit 820, so as to obtain the multiple input events.

The processing unit 840 is configured to process, by using a virtual machine that is of the terminal and set on the server, the multiple input events obtained by the parsing unit 830 to obtain user data generated during the running of the application software.

The parsing unit 830 may include (not shown in FIG. 8):

a data obtaining subunit, configured to obtain transmitted data of one current input event from the aggregate event in order, where the transmitted data includes bitmap information of each piece of attribute information of the current input event and attribute information, which is different from that of a preceding input event, of the current input event, where the bitmap information of each piece of attribute information is used to indicate whether the attribute information is the same as corresponding attribute information of the preceding input event;

an attribute obtaining subunit, configured to obtain, according to indication of the bitmap information obtained by the data obtaining subunit, attribute information, which is the same as that of the preceding input event, of the current input event from the attribute information of the preceding input event; and an event generating subunit, configured to combine the same attribute information obtained by the attribute obtaining subunit and the different attribute information included in the transmitted data obtained by the data obtaining subunit to form the current input event.

The processing unit 840 may include (not shown in FIG. 8):

a state matching subunit, configured to: when a notification indicating that a change occurs on a system state of the virtual machine that is of the terminal and set on the server is received, determine whether the attribute information of the multiple input events matches the system state; and an event processing subunit, configured to: according to a matching result of the state matching subunit, insert an input event corresponding to attribute information that matches the system state into a system of the virtual machine, so that the system invokes a processing function to process the input event.

Figure 9:
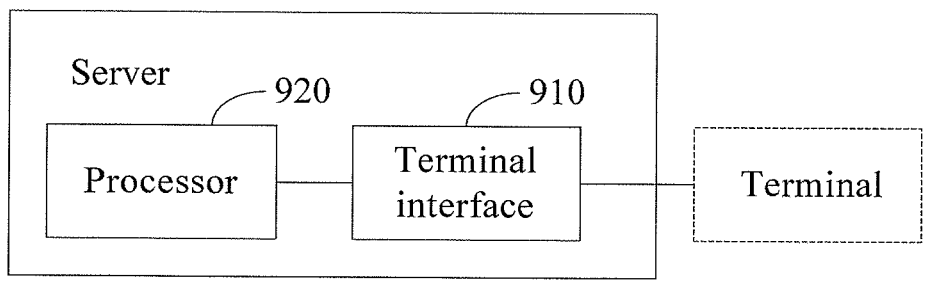
FIG. 9 is a block diagram of an embodiment of a server according to the present invention.

Refer to FIG. 9, which is a block diagram of an embodiment of a server according to the present invention.

The server includes a terminal interface 910 and a processor 920.

The terminal interface 910 is configured to receive an aggregate event transmitted by a terminal, where the aggregate event is an aggregate event obtained by the terminal by aggregating multiple input events after obtaining the multiple input events during running of application software.

The processor 920 is configured to parse the aggregate event to obtain the multiple input events, and process the multiple input events by using a virtual machine that is of the terminal and set on the server to obtain user data generated during the running of the application software.

In an optional implementation manner:

The terminal interface 910 may be specifically configured to receive a compressed aggregate event transmitted by the terminal, where the compressed aggregate event is an event obtained by the terminal after compressing the aggregate event.

The processor 920 may be further configured to decompress the compressed aggregate event to obtain the aggregate event.

In another optional implementation manner:

The processor 920 may be specifically configured to: obtain transmitted data of one current input event from the aggregate event in order, where the transmitted data includes bitmap information of each piece of attribute information of the current input event and attribute information, which is different from that of a preceding input event, of the current input event, where the bitmap information of each piece of attribute information is used to indicate whether the attribute information is the same as corresponding attribute information of the preceding input event; obtain, according to indication of the bitmap information, attribute information, which is the same as that of the preceding input event, of the current input event from the attribute information of the preceding input event; and combine the obtained same attribute information and the different attribute information included in the transmitted data to form the current input event.

In another optional implementation manner:

The processor 920 may be specifically configured to: when a notification indicating that a change occurs on a system state of the virtual machine that is of the terminal and set on the server is received, determine whether the attribute information of the multiple input events matches the system state; and insert an input event corresponding to attribute information that matches the system state into a system of the virtual machine, so that the system invokes a processing function to process the input event.

It can be seen that in the embodiment, a terminal obtains multiple input events during running of application software, aggregates the multiple input events to obtain an aggregate event, and transmits the aggregate event to a server; after parsing the aggregate event to obtain the multiple input events, the server processes the multiple input events by using a virtual machine that is of the terminal and set on the server, so as to obtain user data generated during the running of the application software. In the embodiments of the present invention, the terminal does not need to transmit the user data to the server, but transmits the input events to the server in an event-driven manner, so that a server end triggers execution of the input events by using the virtual machine of the terminal, so as to obtain the user data that is the same as that on a terminal side that runs the application software, thereby ensuring that the server can back up complete user data and improving accuracy of security check on the user data. Moreover, because a size of an aggregated input event transmitted by the terminal is relatively small, compared with that for directly transmitting the user data, less network transmission resources are occupied and a performance overhead of the terminal itself is not affected, which ensures normal running of other services on the terminal.

A person skilled in the art may understand clearly that, the technology in the embodiments of the present invention may be implemented by using software and a necessary general hardware platform. Based on such an understanding, the technical solutions in the embodiments of the present invention essentially, or the part contributing to the prior art may be implemented in the form of a software product. The computer software product is stored in a storage medium, such as a ROM/RAM, a magnetic disk, or an optical disc, and includes several instructions for instructing a computer device (which may be a personal computer, a server, a network device, or the like) to execute the methods described in the embodiments of the present invention or in some parts of the embodiments of the present invention.

Each embodiment in the specification is described in a progressive manner. The same or similar parts in the embodiments are just references to each other. Every embodiment illustrates in emphasis what is different from the other embodiments. In particular, for the system embodiment, because it is basically similar to the method embodiment, the system embodiment is described simply, and the relevant part may be obtained with reference to the part of the description of the method embodiment.

The foregoing embodiments of the present invention are not construed as limitations on the protection scope of the present invention. Any modifications, equivalent replacements and improvements made within the spirit and principle of the present invention shall fall within the protection scope of the present invention.

What is claimed is:

1. A method for synchronizing a terminal mirror, comprising:
   obtaining, by a terminal, multiple input events during running of application software;
   aggregating, by the terminal, the multiple input events to obtain an aggregate event;
   transmitting, by the terminal, the aggregate event to a server, so that after parsing the aggregate event to obtain the multiple input events, the server processes the multiple input events by using a virtual machine that is of the terminal and set on the server, so as to obtain user data generated during the running of the application software;
   wherein aggregating, by the terminal, the multiple input events to obtain an aggregate event comprises:
      obtaining, by the terminal, one current input event according to a generating sequence of the multiple input events,
      generating, by the terminal, bitmap information for each piece of attribute information of the current input event, wherein the bitmap information of each piece of attribute information is used to indicate whether the attribute information is the same as corresponding attribute information of a preceding input event of the current input event,
      determining, by the terminal, the bitmap information and attribute information, which is different from that of the preceding input event, of the current input event as data to be transmitted of the current input event, and
      combining, by the terminal after determining data to be transmitted of each input event of the multiple input events, the data to be transmitted of the multiple input events to form the aggregate event of the multiple input events.

2. The method according to claim 1, wherein before aggregating, by the terminal, the multiple input events, the method further comprises:
   inserting, by the terminal, the obtained input events into an event queue according to an event generating sequence; and
   correspondingly, aggregating, by the terminal, the multiple input events to obtain an aggregate event comprises:

aggregating, by the teiminal, the input events in the event queue according to a set time period to obtain the aggregate event.

3. The method according to claim 1, wherein after obtaining the aggregate event, the method further comprises:
compressing, by the terminal, the aggregate event to obtain a compressed aggregate event; and
correspondingly, transmitting, by the terminal, the aggregate event to a server comprises:
transmitting, by the terminal, the compressed aggregate event to the server.

4. A method for synchronizing a terminal mirror, comprising:
receiving, by a server, an aggregate event transmitted by a terminal, wherein the aggregate event is an aggregate event obtained by the terminal by aggregating multiple input events after obtaining the multiple input events during running of application software;
parsing, by the server, the aggregate event to obtain the multiple input events;
processing, by the server, the multiple input events by using a virtual machine that is of the terminal and set on the server to obtain user data generated during the running of the application software;
wherein parsing, by the server, the aggregate event to obtain the multiple input events comprises:
obtaining, by the server, transmitted data of one current input event from the aggregate event in order, wherein the transmitted data comprises bitmap information of each piece of attribute information of the current input event and attribute information, which is different from that of a preceding input event, of the current input event, wherein the bitmap information of each piece of attribute information is used to indicate whether the attribute information is the same as corresponding attribute information of the preceding input event,
obtaining, by the server according to indication of the bitmap information, attribute information, which is the same as that of the preceding input event, of the current input event from the attribute information of the preceding input event, and
combining, by the server, the obtained same attribute information and the different attribute information comprised in the transmitted data to form the current input event.

5. The method according to claim 4, wherein receiving, by the server, the aggregate event transmitted by the terminal comprises:
receiving, by the server, a compressed aggregate event transmitted by the terminal, wherein the compressed aggregate event is an event obtained by the terminal after compressing the aggregate event; and
before parsing, by the server, the aggregate event, the method further comprises:
decompressing, by the server, the compressed aggregate event to obtain the aggregate event.

6. The method according to claim 4, wherein processing, by the server, the multiple input events by using the virtual machine that is of the terminal and set on the server comprises:
when the server receives a notification indicating that a change occurs on a system state of the virtual machine that is of the terminal and set on the server, determining whether the attribute information of the multiple input events matches the system state; and inserting, by the server, an input event corresponding to attribute information that matches the system state into a system of the virtual machine, so that the system invokes a processing function to process the input event.

7. A terminal, comprising:
a processor; and
a memory coupled to the processor, the memory comprising instructions that, when executed by the processor, cause the terminal to:
obtain multiple input events during running of application software, and aggregate the multiple input events to obtain an aggregate event;
transmit the aggregate event to a server, so that after parsing the aggregate event to obtain the multiple input events, the server processes the multiple input events by using a virtual machine that is of the terminal and set on the server, so as to obtain user data generated during the running of the application software;
obtain one current input event according to a generating sequence of the multiple input events; generate bitmap information for each piece of attribute information of the current input event, wherein the bitmap information of each piece of attribute information is used to indicate whether the attribute information is the same as corresponding attribute information of a preceding input event of the current input event;
determine the bitmap infoiniation and attribute information, which is different from that of the preceding input event, of the current input event as data to be transmitted of the current input event; and
after determining the data to be transmitted of each input event of the multiple input events, combine the data to be transmitted of the multiple input events to form the aggregate event of the multiple input events.

8. The terminal according to claim 7, wherein the memory further comprises instructions that, when executed by the processor, cause the server to:
insert the obtained input events into an event queue according to an event generating sequence; and
aggregate the input events in the event queue according to a set time period to obtain the aggregate event.

9. The terminal according to claim 7, wherein the memory further comprises instructions that, when executed by the processor, cause the server to:
compress the aggregate event to obtain a compressed aggregate event; and
transmit the compressed aggregate event to a cloud server.

10. A server, comprising:
a processor; and
a memory coupled to the processor, the memory comprising instructions that, when executed by the processor, cause the server to:
receive an aggregate event transmitted by a terminal, wherein the aggregate event is an aggregate event obtained by the terminal by aggregating multiple input events after obtaining the multiple input events during running of application software;
parse the aggregate event to obtain the multiple input events, and process the multiple input events by using a virtual machine that is of the terminal and set on the server to obtain user data generated during the running of the application software;
obtain transmitted data of one current input event from the aggregate event in order, wherein the transmitted data comprises bitmap information of each piece of attribute information of the current input event and attribute information, which is different from that of a preceding input event, of the current input event, wherein the bitmap information of each piece of attribute information is used to indicate whether the attribute information is the same as corresponding attribute information of the preceding input event;

obtain, according to indication of the bitmap information, attribute information, which is the same as that of the preceding input event, of the current input event from the attribute information of the preceding input event; and combine the obtained same attribute information and the different attribute information comprised in the transmitted data to form the current input event.

11. The server according to claim 10, wherein the memory further comprises instructions that, when executed by the processor, cause the server to:

receive a compressed aggregate event transmitted by the terminal, wherein the compressed aggregate event is an event obtained by the terminal after compressing the aggregate event; and decompress the compressed aggregate event to obtain the aggregate event.

12. The server according to claim 10, wherein the memory further comprises instructions that, when executed by the processor, cause the server to:

when a notification indicating that a change occurs on a system state of the virtual machine that is of the terminal and set on the server is received, determine whether the attribute information of the multiple input events matches the system state; and insert an input event corresponding to attribute information that matches the system state into a system of the virtual machine, so that the system invokes a processing function to process the input event.

* * * * *